United States Patent Office 2,881,418
Patented Apr. 7, 1959

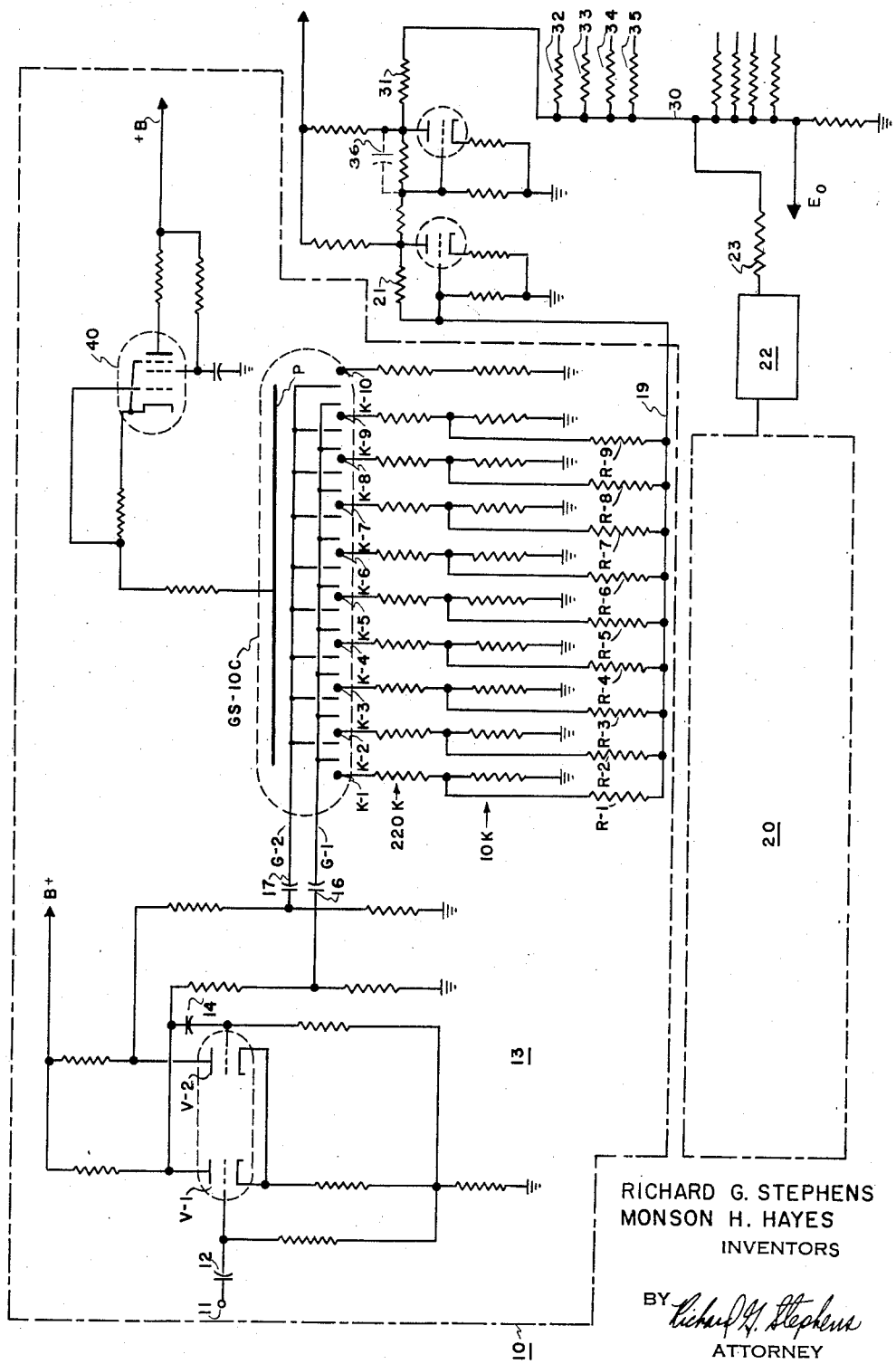
RICHARD G. STEPHENS
MONSON H. HAYES
INVENTORS

2,881,418
DIGITAL TO ANALOGUE CONVERTER UTILIZING A MULTI CATHODE GAS TUBE

Richard G. Stephens and Monson H. Hayes, Binghamton, N.Y., assignors to Link Aviation, Inc., Binghamton, N.Y., a corporation of New York Application August 27, 1954, Serial No. 452,575

2 Claims. (Cl. 340—347)

Our invention relates to apparatus for producing analogue voltages commensurate with the instant count contained in a digital counting circuit. In the computer, automation and instrumentation arts many data are derived and processed in digital form, and it often becomes desirable to convert such data to analogue form for control or indication. For example, recently developed multi-electrode gaseous discharge counting tubes have experienced wide usage in the abovementioned arts due to their simplicity, speed of operation and reliability, and it becomes especially desirable to provide a means whereby the count determined by the discharge position of such pulse counters may be rapidly and accurately converted into an analogue potential. Such counting tubes have been cascaded into pluralities of stages or decades to count large numbers of pulses, and it is also desirable that a means be provided whereby the count registered in such plural stage counters may be determined in analogue form. Furthermore, count comparison between two of such counters is often necessary in computer addition and subtraction apparatus and in servo-mechanisms, and hence it becomes desirable to provide a simple and accurate means by which the sum or difference in count between a pair of such counters may be determined and by which an analogue potential commensurate therewith may be produced.

It is therefore a primary object of the invention to provide a digital to analogue converter suitable for use with multi-electrode counting devices.

It is another object of the invention to provide a digital to analogue converter capable of determining the count in a plurality of decades or stages of an electric counter utilizing a current translatable to a number of positions as a measure of the count in each stage.

It is a further object of the invention to provide apparatus capable of determining the sum of difference in counts between a pair of electric counters of the multi-electrode type and capable of producing an analogue voltage commensurate with said sum or difference in counts. Other objects of the invention will in part be obvious and will in part appear hereinafter. The invention accordingly comprises the features of construction, combination of elements and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which the single figure is an electrical schematic diagram of our invention, in which some parts are shown in block diagram form for sake of clarity.

Referring to the figure, there is indicated a multi-electrode gaseous discharge counting tube GS-10C to which our invention has been applied. Indicated generally at 13 is a conventional driving circuit adapted to receive input pulses at terminal 11 and operable to produce suitable driving voltages for the multi-electrode counting tube. The counting tube may comprise, for example, an Etelco-Ericsson type GS-10C glow transfer counter tube such as is described in detail in Electronic Engineering, May 1950, pp. 173–177. Such a counting tube has a total of thirty-one elements. Thirty of the elements comprise a plurality of similar vertical equi-spaced rods or wires arranged in circular array about a disc-shaped element P, which for convenience may be denominated the "anode." Ten of the thirty vertical wires may be referred to for convenience as "cathodes," though it is to be understood that such "cathodes" need carry no thermionic emissive coating. Situated between each of the "cathode" elements are two of the remaining vertical rods, which may be referred to as "guide" electrodes. Those guide electrodes immediately clockwise from each "cathode" electrode are all connected together within the envelope and a single lead G–1 extends outside the envelope. Similarly, all of the guide electrodes situated immediately counter-clockwise of a cathode are inter-connected and a single lead G–2 extends outside the envelope for connection. Each of the "cathode" elements has an external terminal, as does anode P. All of the elements are situated within a gas-filled envelope. In the drawing the "cathodes" have been indicated as being arranged in linear fashion for sake of clarity, and have been symbolically illustrated differently than the "guide" electrodes for convenience.

If a voltage in excess of the gas ionization potential is applied between anode P and a particular "cathode" electrode, a gaseous glow discharge will be established therebetween. Assume that anode P is connected to a source of positive voltage, and that a voltage sufficiently negative with respect thereto is applied to cathode K–1, so that a glow discharge exists between anode P and cathode K–1. Now, if a more negative voltage than that on cathode K–1 is applied to terminal G–1, the glow discharge will transfer so as to establish itself between anode P and the guide electrode immediately clockwise from cathode K–1, and no longer to exist between cathode K–1 and anode P. In order that the glow discharge may not exist from the anode to more than one electrode at a time, suitable resistance may be inserted in the anode circuit. It will be appreciated that the glow will always transfer one position clockwise rather than two positions counterclockwise. Next, if the potential of terminal G–2 is made more negative than that of G–1, the glow will be further translated clockwise to exist between anode P and the guide electrode immediately counterclockwise from cathode electrode K–2. Finally, if the voltage of cathode electrode K–2 becomes more negative than that of terminal G–2, the glow will transfer to cathode electrode K–2. In this manner, the glow will transfer from a "cathode" to an adjacent "cathode" and hence a count of "one" has been made.

By arbitrarily numbering the cathodes successively from "zero" to "nine" in a given direction, the "count" will progress in an additive manner as the glow is transferred in that direction. Since the electrodes are arranged in circular fashion about anode P, no special resetting provision need be made when progressing from a "nine" to a "zero" count as in those tubes having counting elements arranged in linear fashion.

Hence it will be seen that translation of the glow discharge from cathode to successive cathode is accomplished by successive energization of the guide and cathode electrodes. The driving circuit indicated generally at 13 operates to receive a pulse at its input terminal 11 and to apply negative voltages in proper sequence to the guide electrode terminals G–1 and G–2. Assume that a positive pulse is applied to terminal 11, thereby passing through coupling capacitor 12 to drive the grid of triode V-1 positive. Triode V-1 conducts heavily, and its decrease in plate voltage is coupled through capacitor 14 to the grid of triode V-2, causing triode V-2 to cutoff. The decrease in voltage on the plate V-1 is applied through capacitor 16 to the G-1 terminal. If a glow has theretofore been established to a particular cathode, the negative pulse on terminal G-1 will cause the glow to transfer clockwise as mentioned above. Capacitor 14 will discharge, and when the grid of triode V-2 becomes sufficiently positive, transition will occur by V-2 conducting heavily and V-1 going beyond cutoff. The decrease in plate voltage on V-2 upon transition applies a negative pulse through capacitor 17 to terminal G-2, causing the glow to be transferred further clockwise. As the negative pulse on terminal G-2 terminates, the glow will transfer still further clockwise to the adjacent "cathode" electrode. The "cathode" electrodes of the counting tube are each connected to ground through two resistors as shown in the figure, and hence when no glow exists to a given cathode it will remain at ground potential. Thus it may be seen that the two negative pulses supplied by driving circuit 13 to terminals G-1 and G-2 upon occurrence of each positive input pulse serve to translate the glow from one cathode to an adjacent clockwise cathode to accomplish a count of "one." It will be apparent to those skilled in the art that the repetition rate of the positive input pulses should not be so great that the driving circuit does not have time to produce its pair of negative pulses.

Upon occurrence of each input pulse the glow will be transferred from a cathode momentarily to two guide electrodes and then to the adjacent cathode. As additional input pulses are applied, the glow will revolve around the anode, and its position at any instant will be a measure of the number of input pulses applied. "Carry" circuits may be connected as shown in the above-mentioned technical article in order to actuate succeeding decades or stages, and hence large number of pulses may be counted.

In order to generate an analogue potential commensurated with the count registered, we have sampled the cathode voltages of the counting tube and have utilized cathode voltages to apply currents in a parallel-adding resistance circuit to provide an analogue potential proportional to the count. As seen in the figure, the junction point between the 220K and 10K resistors connecting each cathode electrode (except cathode K-10) to ground is connected through a summing resistor (R-1 to R-9) to conductor 19. When the glow exists to a particular "cathode" electrode, the glow current raises the cathode potential above ground, and the portion of the voltage rise appearing across the 10,000 ohms resistor applies a current through the associated summing resistor (R-1 to R-9) commensurate with the "count." In order to accomplish this, it is necessary that resistors R-1 to R-9 be selected in accordance with the number of their associated cathode electrode. For example, resistor R-2 may have a resistance one-half as great as that of resistor R-1, so that energization of cathode K-2 causes twice as much current to be applied to conductor 19 as would energization of cathode K-1; resistor R-3 may have a resistance one-third as great as that of resistor R-1, etc. Exemplary ohmic values for the "summing" resistors R-1 to R-9 for use with the circuit shown may be:

| | |
|---|---|
| R-1 | 900,000 |
| R-2 | 450,000 |
| R-3 | 300,000 |
| R-4 | 225,000 |
| R-5 | 180,000 |
| R-6 | 150,000 |
| R-7 | 128,570 |
| R-8 | 112,500 |
| R-9 | 100,000 |

Since the translation of the glow to the K-10 cathode is indicative of a "zero" count, the cathode voltage on cathode K-10 is not sampled, and no current is applied to conductor 19 when a "zero" count exists.

The voltage on conductor 19 is applied to a conventional direct-coupled feedback amplifier indicated generally at 21. The voltage on conductor 19 is thereby amplified and applied to conductor 30 through summing resistor 31. While we have shown a feedback amplifier comprised of two identical triode vacuum tube amplifiers, it is to be understood that many other amplifiers may be substituted by those skilled in the art without departing from our invention. Furthermore, a greater or lesser number of amplifying stages may be employed. For use with the R-1 to R-9 resistors shown, the amplifier used may have a feedback impedance of approximately 5 megohms to provide a conveniently-handled voltage output. Regardless of the type of amplifier utilized, it is desirable that such amplifier operate linearly, and hence feedback amplifiers are recommended. It will be apparent to those skilled in the art that the "amplifiers" utilized also serve as isolating devices, and hence some apparatus constructed according to the invention may use cathode followers, depending upon the voltage levels desired.

The output voltage from the amplifying means will thereby be commensurate with the "count" registered in the counting tube GS-10C, and hence the current applied to conductor 30 may be an analogue voltage proportional to the count. Second and higher order decades or stages may be identical to that shown and described, and currents proportional to the count registered in such stages may be applied to conductor 30 through summing resistors 32, 33, 34, 35. Since the position of the glow in the higher order stages represents the more significant digits of the total count, the currents applied through the higher order stages may be weighted (e.g., by factors of ten in "decade" counters) either by providing amplifying means having higher gain, or by using summing resistors having less resistance as counterparts of resistor 31, or by both methods. With the higher order stages connected as described to conductor 30, the current applied to conductor 30 will be commensurate with the count of the entire counting system, and a voltage proportional thereto will appear at output terminal $E_0$.

Other counting systems may be similarly connected to conductor 30 to provide analogue voltage outputs proportional to sums and differences between the counts registered in the various counters. For example, a counter indicated as a block at 20 and constructed similarly to that illustrated at 10 may be connected to conductor 30 through amplifying means 22 and a summing resistor 23 to apply currents to conductor 30 commensurate with the count of a different series of pulses. In order to provide an output potential at $E_0$ commensurate with the sum of the counts applied to the two counters, the amplifying means 21 and 22 should have equal numbers of phase-inverting stages. In order to provide an output potential at $E_0$ commensurate with the difference in the numbers of pulses applied to the two counters, it is necessary that the amplifying means of the systems have a different number of phase-inverting stages, so that one amplifying system produces a signal of opposite polarity. The currents applied to conductor 30 will then be summed algebraically. It will be seen that any number of counting systems may be connected to conductor 30 in similar fashion to apply adding or subtracting currents.

While we have shown our invention utilized to provide an output potential having a magnitude directly proportional to a digital number, it will be apparent that provision of summing resistances in accordance with any other function of cathode numbers will enable one to produce output potentials having a magnitude which is commensurate with any other function.

The voltages applied to conductor 19 will be seen to exist whenever a glow exists to any one of cathodes K-1 to K-9. During the period in which the glow transfers to an adjacent cathode, it exists momentarily on each of the intermediate guide electrodes, and during such time no voltage output is applied to conductor 19 nor through resistor 31 to conductor 30. To this extent the output voltage from the system is not continuous. While this phenomenon is not important for most applications, and while such period may be very short if the driving circuit is constructed with a short time constant, it is sometimes desirable to remove sharp transients from the output voltage. This may be done simply by providing a high-pass filter in the output circuit. Such a filter is preferably provided between two stages of the amplifying means, and is exemplified by the small capacitor 36 shown in dotted lines.

While the electrodes of the multi-electrode gaseous discharge counting tube are preferably identical and arranged as uniformly as possible, small errors in tube construction might result in slightly different amounts of anode current as the glow is transferred to the various cathodes. In order to provide the same potential at each cathode sampling point to insure accurate current application to conductor 19, we have inserted a constant current device comprising a conventional pentode 40 into the anode circuit of the counting tubes. Assume that a glow exists to cathode electrode K-1 of the counting tube. Current regulated in magnitude by pentode 40 will flow from anode P to cathode electrode K-1. As a negative pulse is applied through capacitor 16 and terminal G-1 to the guide electrode immediately clockwise from cathode K-1, a portion of the glow will start to flow to the guide electrode. Since pentode 40 maintains anode current constant, a lesser portion of anode current may flow to cathode K-1, and the glow discharge is thereby transferred with greater speed and reliability to the guide electrode.

While we have shown our invention as applied to a particular type of counting device, it will become apparent to those skilled in the art that the invention is as well applicable to numerous other counting devices in which a current is translated to one of a base number of electrodes in accordance with the number of input pulses applied. For example, the fixed contacts of telephone type stepping switches often have currents applied to them by a selector translated from one contact to another by applied pulses, and the digital number represented by the selector position may be converted into an analogue potential in a manner similar to that shown for converting glow discharge position into an analogue potential.

It will also be apparent to those skilled in the art that our invention is as well applicable to counting circuits employing counting bases other than "ten," such as by using counting tubes having a greater or lesser number of successively energized electrodes. Those skilled in the art will readily perceive that the component values we have shown are exemplary only and that numerous alterations made be made therein without departing from the invention.

Thus, it will be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Digital to analogue conversion apparatus for producing an output potential commensurate in magnitude with a number represented by a series of input pulses comprising in combination a multi-electrode gaseous discharge tube having an anode connected to a source of current, a plurality of successively-numbered electrodes arranged in circular array about said anode and translating means responsive to input pulses to translate current successively to said electrodes, a plurality of impedances, each of said impedances being connected to one of said numbered electrodes and to a common output conductor, the value of each impedance being a function of the number of its associated electrode, and a constant current device connected in circuit relationship with said anode.

2. Apparatus for deriving an output potential commensurate in magnitude with a number represented by a series of input pulses comprising in combination, a multi-electrode gaseous discharge tube having an anode connected to a source of current, a plurality of successively-numbered electrodes arranged in circular array about said anode and a translating means responsive to said input pulses for translating current from said anode successively and individually to each of said electrodes, a plurality of impedances, each of said impedances being connected to one of said electrodes and to a common conductor, the value of each of said impedances being inversely commensurate with the number of its associated cathode, and a pentode connected in series with said anode to maintain anode current constant.

References Cited in the file of this patent

UNITED STATES PATENTS

| | | |
|---|---|---|
| 2,146,761 | Philpott | Feb. 14, 1939 |
| 2,597,088 | Dutilh | May 20, 1952 |
| 2,658,139 | Abate | Nov. 3, 1953 |
| 2,718,634 | Hansen | Sept. 20, 1955 |
| 2,731,631 | Spaulding | Jan. 17, 1956 |

OTHER REFERENCES

Electronic Engineering (Crafton), October 1953, pages 424–426.

Blunden: "Proceedings of Conference on Automatic Computing Machines held by Univ. of Sydney, Melbourne, August 1951," Fig. 1 and page 188.

Miller, Waddell, Patmore: "Electronics," October 1952; pages 127–129.

Huggins: "Electronic Engineering," December 1952, pages 578–579.